US011805012B2

(12) United States Patent
Kuris et al.

(10) Patent No.: US 11,805,012 B2
(45) Date of Patent: Oct. 31, 2023

(54) CLOUD NETWORK MECHANISM DRIVER MIGRATION

(71) Applicant: RED HAT, INC., Raleigh, NC (US)

(72) Inventors: Eran Kuris, Holon (IL); Arie Bregman, Gan Yavne (IL)

(73) Assignee: Red Hat, Inc., Raleigh, NC (US)

( * ) Notice: Subject to any disclaimer, the term of this patent is extended or adjusted under 35 U.S.C. 154(b) by 182 days.

(21) Appl. No.: 17/513,293

(22) Filed: Oct. 28, 2021

(65) Prior Publication Data

US 2023/0137273 A1    May 4, 2023

(51) Int. Cl.
*H04L 41/0813* (2022.01)
*H04L 12/46* (2006.01)

(52) U.S. Cl.
CPC ...... *H04L 41/0813* (2013.01); *H04L 12/4641* (2013.01)

(58) Field of Classification Search
CPC .................. H04L 41/0813; H04L 12/4641
See application file for complete search history.

(56) References Cited

U.S. PATENT DOCUMENTS

| | | | |
|---|---|---|---|
| 8,688,792 B2 | 4/2014 | Singh et al. | |
| 8,745,233 B2* | 6/2014 | Bartfai-Walcott | G06F 9/4856 718/1 |
| 9,189,294 B2 | 11/2015 | Considine et al. | |
| 9,461,969 B2* | 10/2016 | Watt | H04L 63/0272 |
| 10,133,607 B2 | 11/2018 | Suit | |
| 10,554,501 B2 | 2/2020 | Parandehgheibi et al. | |
| 10,826,723 B1* | 11/2020 | Strauss | G06F 9/45558 |
| 10,944,630 B2 | 3/2021 | Patil et al. | |

* cited by examiner

*Primary Examiner* — Thanh T Nguyen
(74) *Attorney, Agent, or Firm* — Womble Bond Dickinson (US) LLP (57) ABSTRACT

A method includes updating a cloud networking environment from a first network mechanism driver to a second network mechanism driver and identifying a configuration of one or more resources of the cloud networking environment associated with the first network mechanism driver. The method further includes determining one or more features of the configuration of the one or more resources that are incompatible with the second network mechanism driver and updating the one or more features of the configuration of the one or more resources to be compatible with the second network mechanism driver.

20 Claims, 5 Drawing Sheets

CLOUD NETWORK MECHANISM DRIVER MIGRATION

TECHNICAL FIELD

Aspects of the present disclosure relate to cloud networking environments, and more particularly, migration of a cloud networking environment to a new cloud network mechanism driver.

BACKGROUND

A cloud networking environment may include several virtual execution environments (e.g., virtual machines, containers, etc.) that are connected by a virtual network that is overlaid on one or more physical machines that are connected via a physical network. The cloud networking environment may be realized with one or more virtual networking protocols. A cloud network mechanism driver may ensure that the resources of the environment operate over the network in accordance with the virtual networking protocols.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

When an existing cloud networking environment migrates to the use of a new network mechanism driver from a previous driver, the environment may become inoperable if one or more parameters of the resources of the cloud networking environment conflict with the parameters expected by the new network mechanism driver. Such a migration may be performed for several reasons, such as deprecation of the previous driver, additional support or functionality of the new driver, etc. For example, a migration for an environment may occur from an ML2/OVS mechanism driver to an ML2/OVN mechanism driver. However, upon migration to the new network mechanism driver, several changes to the resources of cloud networking environment may need to be made for the cloud networking environment to operate properly with the new network mechanism driver. For example, the new driver may enforce a different type of tunneling protocol than the previous driver, and thus the cloud networking environment may be inoperable until each resource in the environment is updated with the proper tunneling protocol. Several other network configuration parameters may also need to be updated upon the migration.

In conventional systems, the networking parameters of the resources of the cloud networking environment may be updated manually based on the requirements of the new network mechanism driver after a migration. Many different resources, protocols, or even network topologies may be manually updated to ensure compatibility with the new network mechanism driver. However, such manual updating of the cloud resources can be time consuming and error prone due to the large number of resources and networking parameters that may need to be changed.

Aspects of the disclosure address the above-noted and other deficiencies by providing a process for automatically updating networking parameters of cloud resources for a cloud network mechanism driver migration. In some examples, a driver migration component may collect information from each of the resources of the cloud environment. The collected information may include networking parameters (e.g., a networking configuration) associated with each of the resources, such as maximum transmission unit (MTU), tunneling protocol, existing agents, etc. Accordingly, the driver migration component can obtain a detailed view of the resources of the cloud environment. The driver migration component may collect the resource information before, during, and after the migration of the environment to the new network mechanism driver. After the migration occurs, the driver migration component may compare the collected networking parameters of the resources to the networking configurations associated with the new network mechanism driver. The driver migration component may identify any differences between the collected network parameters of the resources and the networking configurations enforced by the network mechanism driver. The driver migration component may thus determine which of the networking parameters of each of the resources of the cloud environment should be updated to provide proper operation of the cloud networking environment. After each of the parameters that are to be updated are identified, the driver migration component may either automatically update the parameters for the resources or provide a suggestion to a user (e.g., a network administrator, migration manager/team, etc.) identifying which parameters of the resources should be updated. In some examples, the resource networking parameters are updated immediately after migration and before operation of the cloud networking environment continues with the new network mechanism driver.

By providing for automatic identification of networking parameters of cloud resources that are incompatible with a new network mechanism driver, embodiments of the present disclosure can significantly reduce the time required to migrate an existing cloud environment to a new network mechanism driver. Additionally, automatically identifying the necessary parameters to update as well as automatically updating the parameters may reduce mistakes from manual updates and may ensure proper operation of the cloud environment after the migration.

Figure 1:
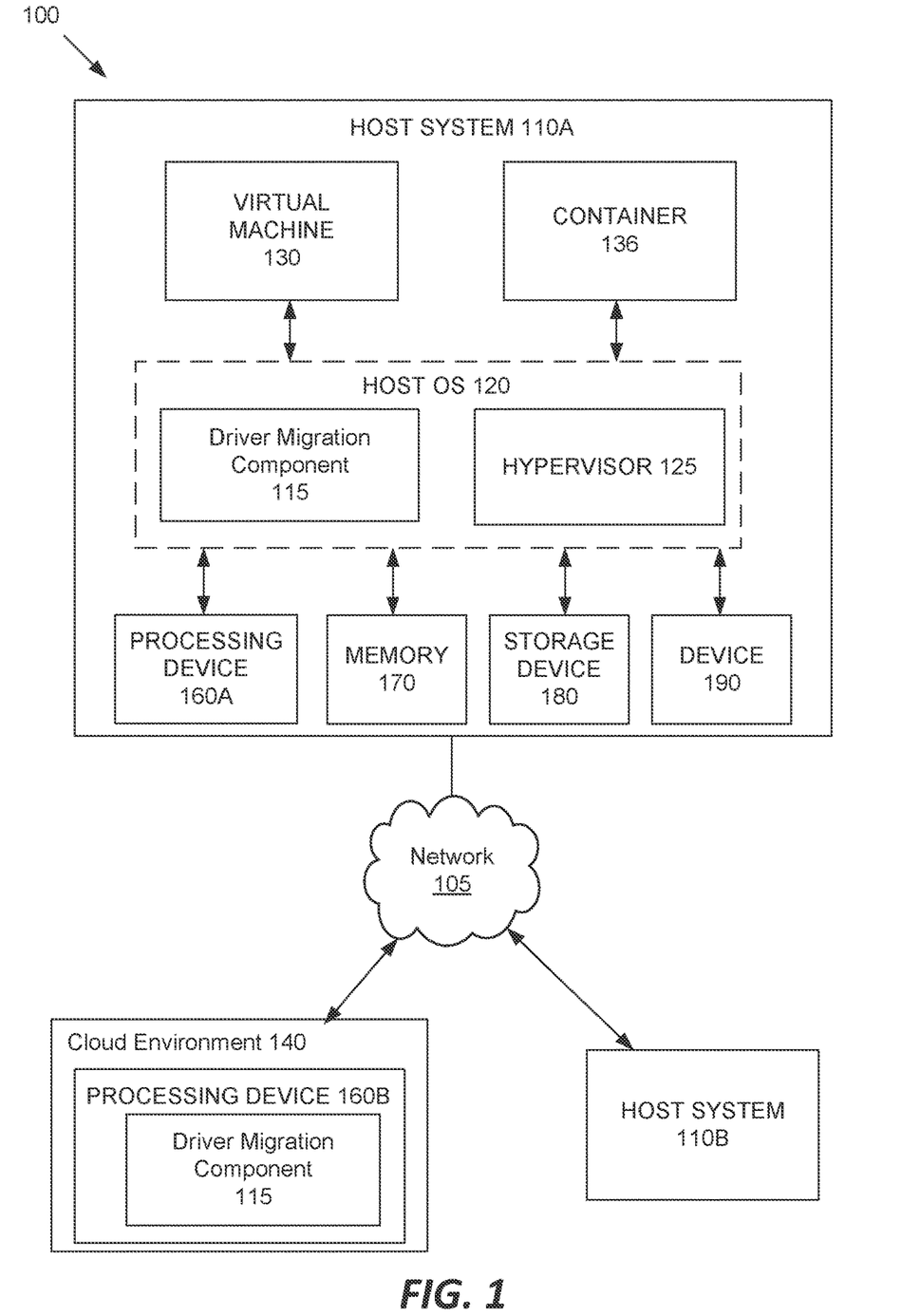
FIG. 1 is a system diagram that illustrates an example system for cloud network mechanism driver migration, in accordance with some embodiments.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host systems 110A-B and cloud environment 140. The host systems 110A-B and cloud environment 140 include one or more processing devices 160A-B, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A-B. It should be noted that although, for simplicity, host system 110A is depicted as including a single processing device 160A, storage device 180, and device 190 in FIG. 1, other embodiments of host systems 110A may include a plurality of processing devices, storage devices, and devices. Similarly, cloud environment 140 and host system 110B may include a plurality of processing devices, storage devices, and devices. The host systems 110A-B and cloud environment 140 may each be a server, a mainframe, a workstation, a personal computer (PC), a mobile phone, a palm-sized computing device, etc. In embodiments, host systems 110A-B and cloud environment 140 may be separate computing devices. In some embodiments, host systems 110A-B and/or cloud environment 140 may be implemented by a single computing device. For clarity, some components of cloud environment 140 and host system 110B are not shown. Furthermore, although computer system architecture 100 is illustrated as having two host systems, embodiments of the disclosure may utilize any number of host systems.

Host system 110A may additionally include one or more virtual machines (VMs) 130, containers 136, and host operating system (OS) 120. VM 130 is a software implementation of a machine that executes programs as though it were an actual physical machine. Container 136 acts as an isolated execution environment for different functions of applications. The VM 130 and/or container 136 may be an instance of a serverless application or function for executing one or more applications of a serverless framework. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110A-B and cloud environment 140 may be coupled (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110A-B and/or cloud environment 140. In some embodiments, host system 110A and 110B may be a part of cloud environment 140. For example, the virtual machines 130 and/or containers 136 of host system 110A and 110B may be a part of a virtual network of the cloud environment 140.

In embodiments, processing device 160B of the cloud environment 140 may execute a driver migration component 115. In some examples, at least a portion of the driver migration component 115 may execute within the host OS 120 of host system 110A. The driver migration component 115 may identify networking configurations or parameters from the resources of the cloud environment 140 that are incompatible with the networking configurations enforced by a new network mechanism driver to which the cloud environment 140 has been migrated. For example, the driver migration component 115 may collect networking parameters from each of the resources of the virtual cloud network (e.g., routers, networks, ports, or any other networking entity). The driver migration component 115 may then determine whether any of the collected networking parameters are in conflict with the networking configurations and parameters enforced by the new network mechanism driver. The driver migration component 115 may update the resources with parameters that match the network mechanism driver parameters/configurations or provide a suggestion to update the parameters of the resources that are incompatible. Further details regarding the driver migration component 115 will be discussed at FIGS. 2-5 below.

Figure 2:
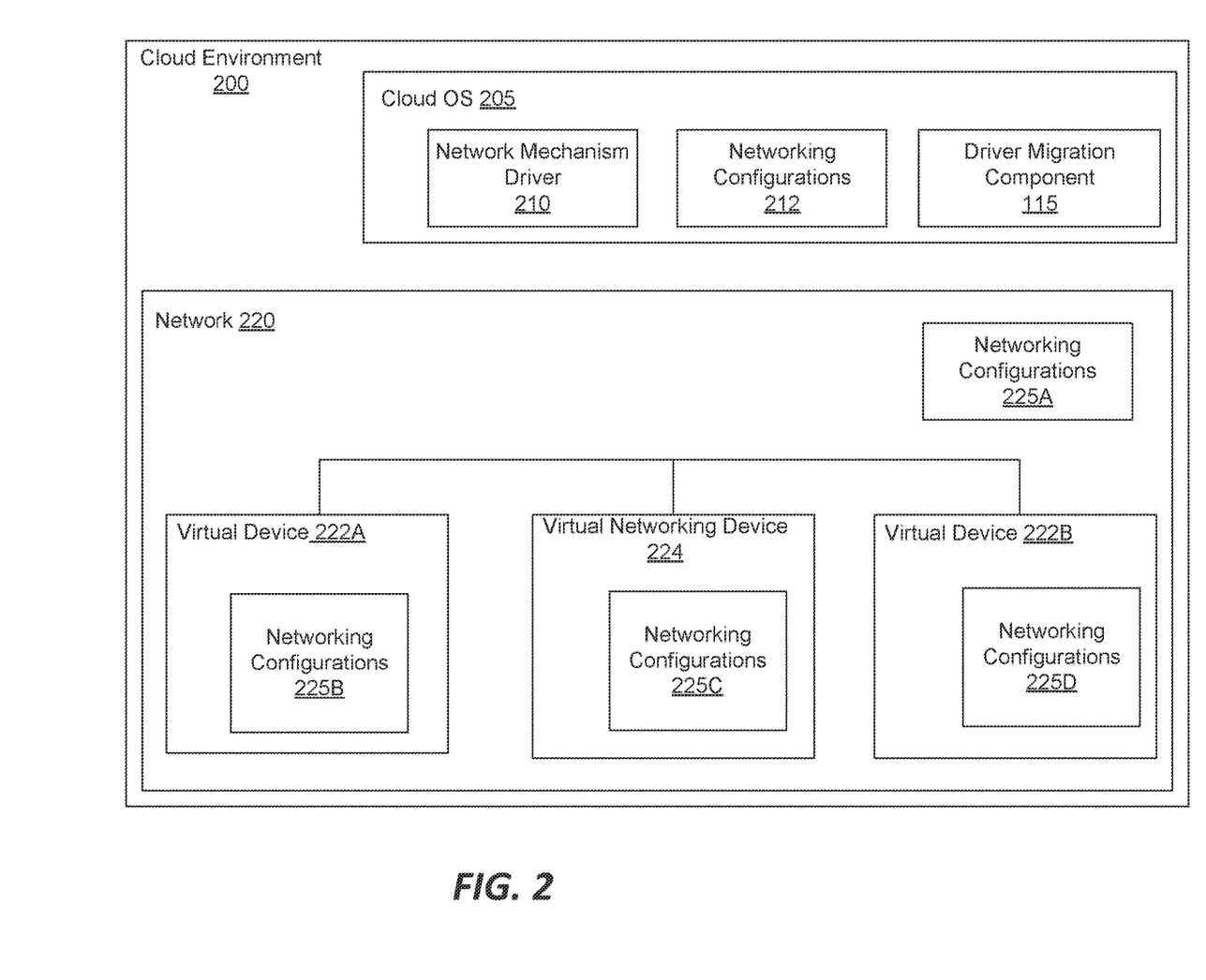
FIG. 2 is a system diagram that illustrates another example of a system for cloud network mechanism driver migration in accordance with embodiments of the disclosure.

FIG. 2 is a block diagram that illustrates a cloud environment 200 for migration to a new network mechanism driver, according to some embodiments. The cloud environment 200 may include a cloud operating system (OS) for managing functionality of the cloud environment 200. The cloud OS 205 may include a network mechanism driver 210 for managing networking functionality within the cloud environment 200. For example, network mechanism driver 210 may enforce networking configurations 212 for networking operations among networking resources of the cloud environment 200.

Cloud environment 200 may further include one or more networks 220 each of which may include one or more virtual devices 222A-B and one or more virtual networking devices 224. Collectively, the networks, virtual devices, and virtual networking devices may be referred to as resources of the cloud environment 200. In some embodiments, the cloud environment 200 may migrate from one network mechanism driver to another. For example, upon deprecation of a previous driver, release of a new driver, etc. the cloud environment 200 may be updated with a new network mechanism driver. The new network mechanism driver may enforce different networking configurations and parameters than the previous network mechanism driver. However, in an existing cloud environment (e.g., cloud environment 200), the network mechanism driver may not have a view of the networking configurations of the resources. While the network mechanism driver manages network functions, the network mechanism driver may be unaware of the resources of the cloud environment. Thus, the networking configurations of the resources in the cloud environment may need to be updated to be compatible with the networking configurations enforced by the network mechanism driver.

According to the depicted example, network mechanism driver 210 may be a new driver and may enforce networking configurations 212. The driver migration component 115 may inspect the resources of the cloud environment to determine if, and which, resource configurations are incompatible with the network mechanism driver. For example, the driver migration component 115 may identify each of the networking resources within the cloud environment 200 (e.g., routers, networks, ports, subnets, security groups, or any other networking entity). Thus, the driver migration component 115 may identify the network 220, virtual devices 222A-B, and virtual networking device 224 in the cloud environment. The driver migration component may then collect information about each networking resource, such as networking configurations 225A-D, each of which may include several networking parameters associated with their corresponding resources. The parameters of the networking configurations 225A-D may include any information associated with networking in the cloud environment, such as MTU size and value parameters, networking tunneling protocol (e.g., VXLAN, GENEVE, etc.), IP protocol version, networking agents, router configuration (e.g., distributed or not distributed), routing high availability, dynamic host configuration protocol (DHCP) lease, or any other metadata of the networking resources.

In one example, the driver migration component 115 may compare the networking configurations 225A-D to the networking configurations 212 enforced by the network mechanism driver 210. The driver migration component 115 may determine which parameters of the networking configurations 225A-D of the networking resources should be updated to match, or be compatible with, networking configurations 212 for proper operation of the cloud environment 200. In one example, the driver migration component 115 may automatically update the mismatched or incompatible parameters of the networking configurations 225A-D with values providing compatibility with the networking configurations 212 of the network mechanism driver 210. In another example, the driver migration component 115 may provide a suggestion (e.g., via a user interface) to update the identified networking configuration parameters that should be updated for proper operation of the cloud environment 200.

Figure 3:
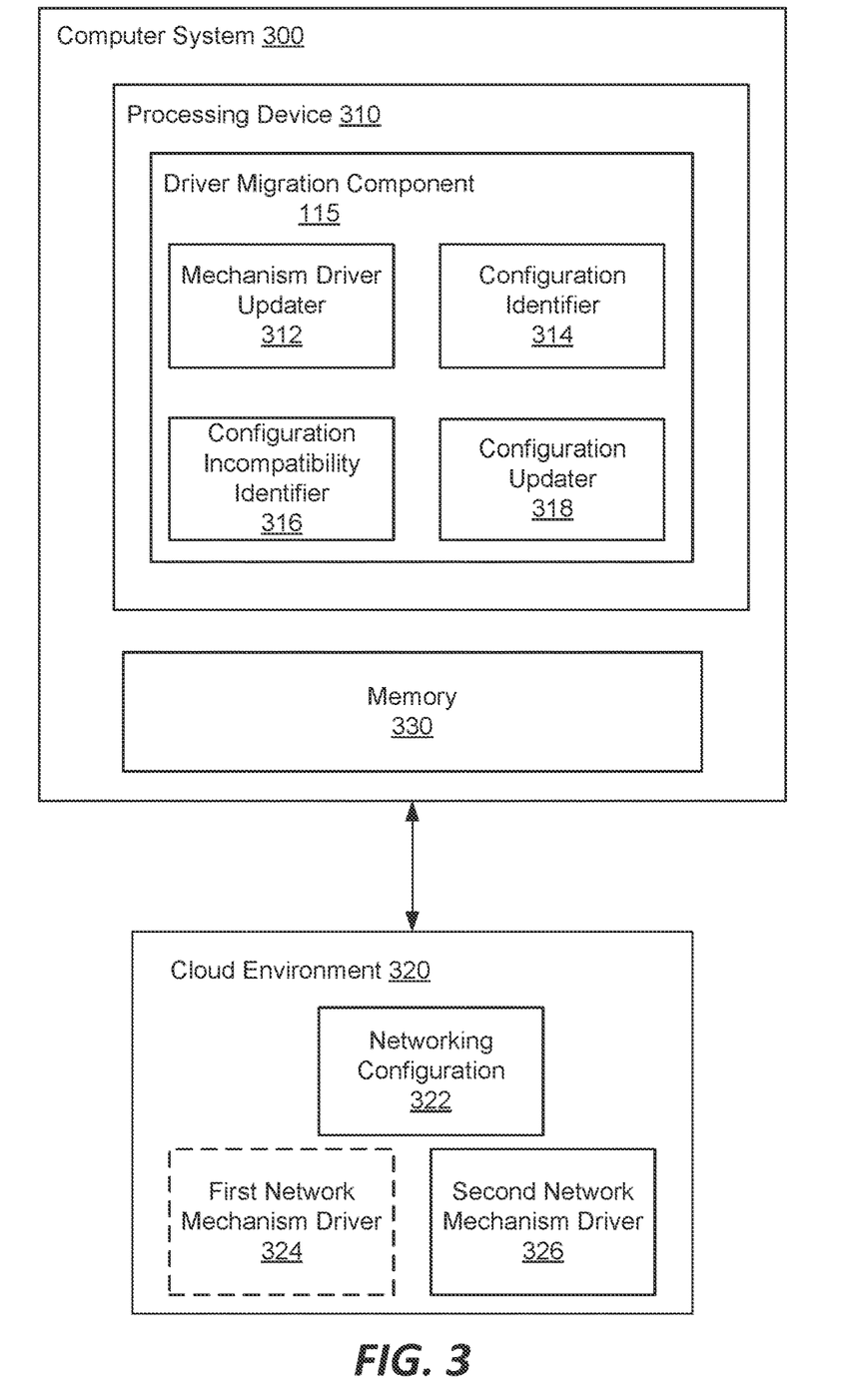
FIG. 3 is a block diagram that illustrates another example of a system for cloud network mechanism driver migration in accordance with embodiments of the disclosure.

FIG. 3 is a block diagram that illustrates a computing system 300 for migration of a cloud environment to a new network mechanism driver, according to some embodiments. Computing system 300 may include a processing device 310 and memory 320. Memory 320 may include volatile memory devices (e.g., random access memory (RAM)), non-volatile memory devices (e.g., flash memory) and/or other types of memory devices. Processing device 310 may be a central processing unit (CPU) or other processing device of computing system 300. In one example, computer system 300 may be coupled to a computing cluster 340. In another example, computer system 300 may be included within cloud environment 320 or computing environment 320 may be included within computer system 300.

In one example, the processing device 310 may execute a driver migration component 115 to migrate a cloud environment 320 from a first network mechanism driver 324 to a second network mechanism driver 326 and update networking configurations for resources of the cloud environment 320. The driver migration component 115 may include a mechanism driver updater 312, a configuration identifier 314, a configuration incompatibility identifier 316, and a configuration updater 318. The mechanism driver updater 312 may update cloud environment 320 from a first network mechanism driver 324 to a second network mechanism driver 326. For example, a user or administrator of the cloud environment 320 may initiate an update, also referred to as a migration, to the second network mechanism driver 326 for several reasons, such as deprecation of the first network mechanism driver 324, added support for the second network mechanism driver 326, etc. The mechanism driver updater 312 may install the second network mechanism driver 326 in the cloud environment 320 and remove the first network mechanism driver 324. In some examples, the second network mechanism driver 326 may enforce different networking configurations from the first network mechanism driver 324. Therefore, configuration identifier 314, configuration incompatibility identifier 316, and configuration updater 318, may update configurations of the resources in the cloud environment 320 to be compatible with the second network mechanism driver 326.

In some examples, configuration identifier 314 may collect information about each networked resource within the cloud environment 320. For example, the configuration identifier 314 may first list each of the networking resources in the cloud environment 320 and then determine configurations (e.g., parameters, features, etc.) associated with each of the networking resources. For example, the configuration identifier 314 may collect MTU size and value parameters, networking tunneling protocol (e.g., VXLAN, GENEVE, etc.), IP protocol version, networking agents, router configuration (e.g., distributed or not distributed), routing high availability, DHCP lease, or any other metadata of the networking resources.

In some examples, configuration incompatibility identifier 316 may determine whether any of the features, parameters, values, etc. of the networking configurations 322 of the networking resources are incompatible with configurations enforced by the second network mechanism driver 326. For example, the configuration incompatibility identifier 316 may compare the networking configurations enforced by the second network mechanism driver 326 with the features/parameters of each of the networking resources of the cloud environment 320 to determine if any are different or are incompatible. The configuration incompatibility identifier 316 may then list each of the features/parameters that are incompatible with the second network mechanism driver 326. In some examples, the configuration updater 318 automatically updates each of the resource features/parameters listed by the configuration incompatibility identifier 316 to match the value of the configurations enforced by the second network mechanism driver 326. In another example, the configuration updater 318 may provide suggested updates (e.g., as a list, as an update authorization, etc.) to a user to select whether the changes, or which changes, should be performed.

Figure 4:
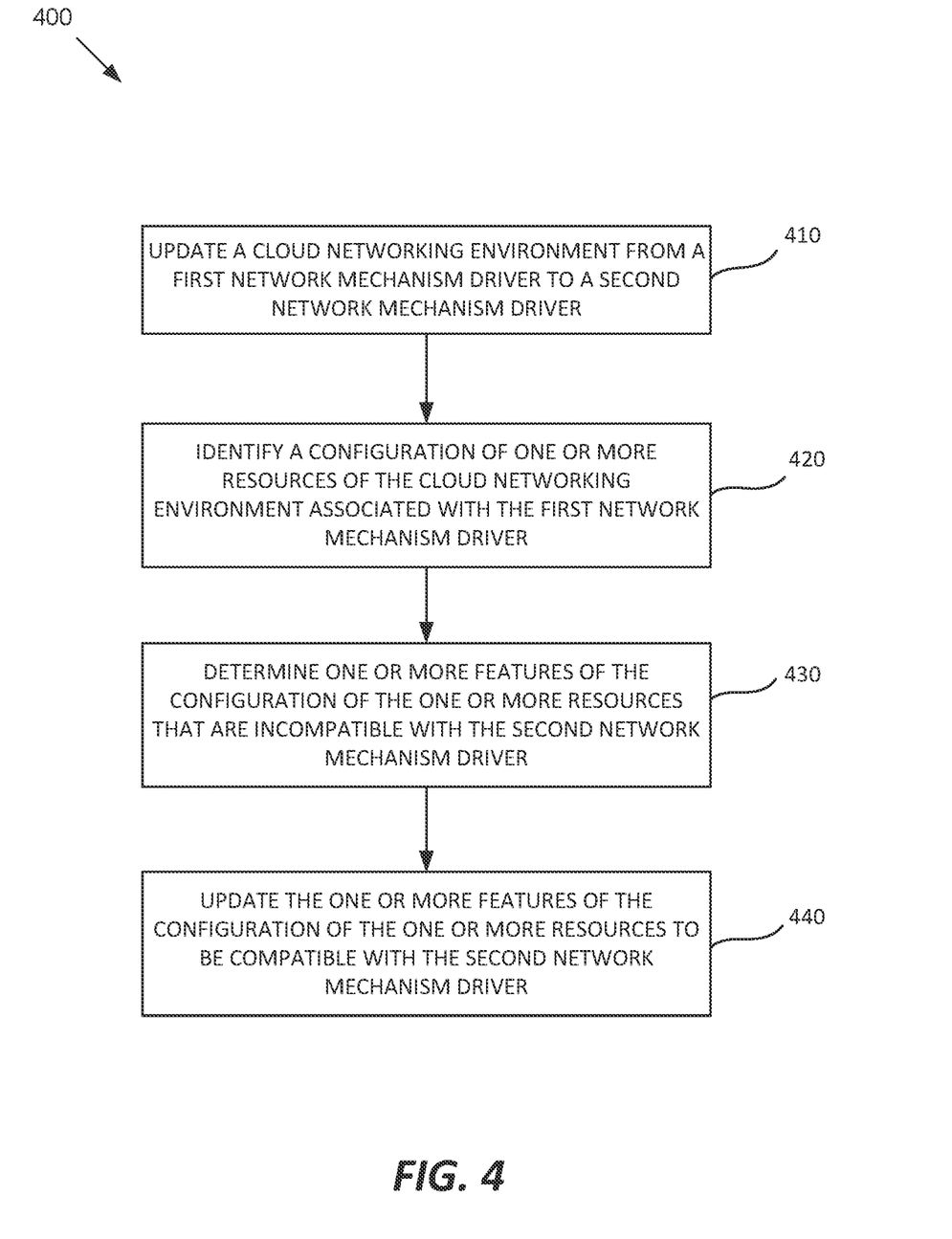
FIG. 4 is a flow diagram of a method of cloud network mechanism driver migration, in accordance with some embodiments.

FIG. 4 is a flow diagram of a method 400 of virtual machine networking configuration migration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a driver migration module 115 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic updates a cloud networking environment from a first network mechanism driver to a second network mechanism driver. The first and second network mechanism drivers may each enforce networking configurations for the cloud networking environment. For example, the network mechanism drivers may manage network bridges that are enforced at the operating system level, monitor and enforce behavior of network functions of the cloud networking environment, and ensure that type driver information is applied properly to the associated network mechanism. The second network mechanism driver, however, may enforce different networking configurations than the first network mechanism driver. Because the second network mechanism driver may not be aware of the resources of the cloud networking environment, the configurations of the resources may not be updated from the configurations for the first network mechanism driver to the second network mechanism driver. Thus, incompatibilities may arise between configurations of the resources in the cloud environment and the configurations enforced by the second network mechanism driver.

At block 420, the processing logic identifies a configuration of one or more resources of the cloud networking environment associated with the first network mechanism driver. The processing logic may scan and collect information for each networking resource in the cloud networking environment that may be affected by the migration. The information may include parameters and/or features of the networking configurations of each of the networking resources. For example, the processing logic may collect information such as MTU size, networking tunneling protocols (e.g., VXLAN, GENEVE, etc.), IP protocol version, networking agents, router configurations (e.g., distributed or not distributed), routing high availability, DHCP lease, or any other metadata of the networking resources.

At block 430, the processing logic determines one or more features of the configuration of the one or more resources that are incompatible with the second network mechanism driver. For example, the processing logic may determine any features of the configuration of the resources in the cloud networking environment that may affect operation of the cloud networking environment. The processing logic may identify any resource configuration features/parameter values that do not match, or are incompatible with, the configurations associated with the second network mechanism driver.

At block 440, the processing logic updates the one or more features of the configuration of the one or more resources to be compatible with the second network mechanism driver. In one example, the processing logic may automatically update each configuration parameter of the one or more resources to be compatible with the second network mechanism driver. In another example, the processing logic may provide suggestions to a user to confirm or select recommended updates to the configurations of the resources. The processing logic may then perform the updates in response to receiving a user selection to perform some or all of the recommended updates to the resource configurations.

Figure 5:
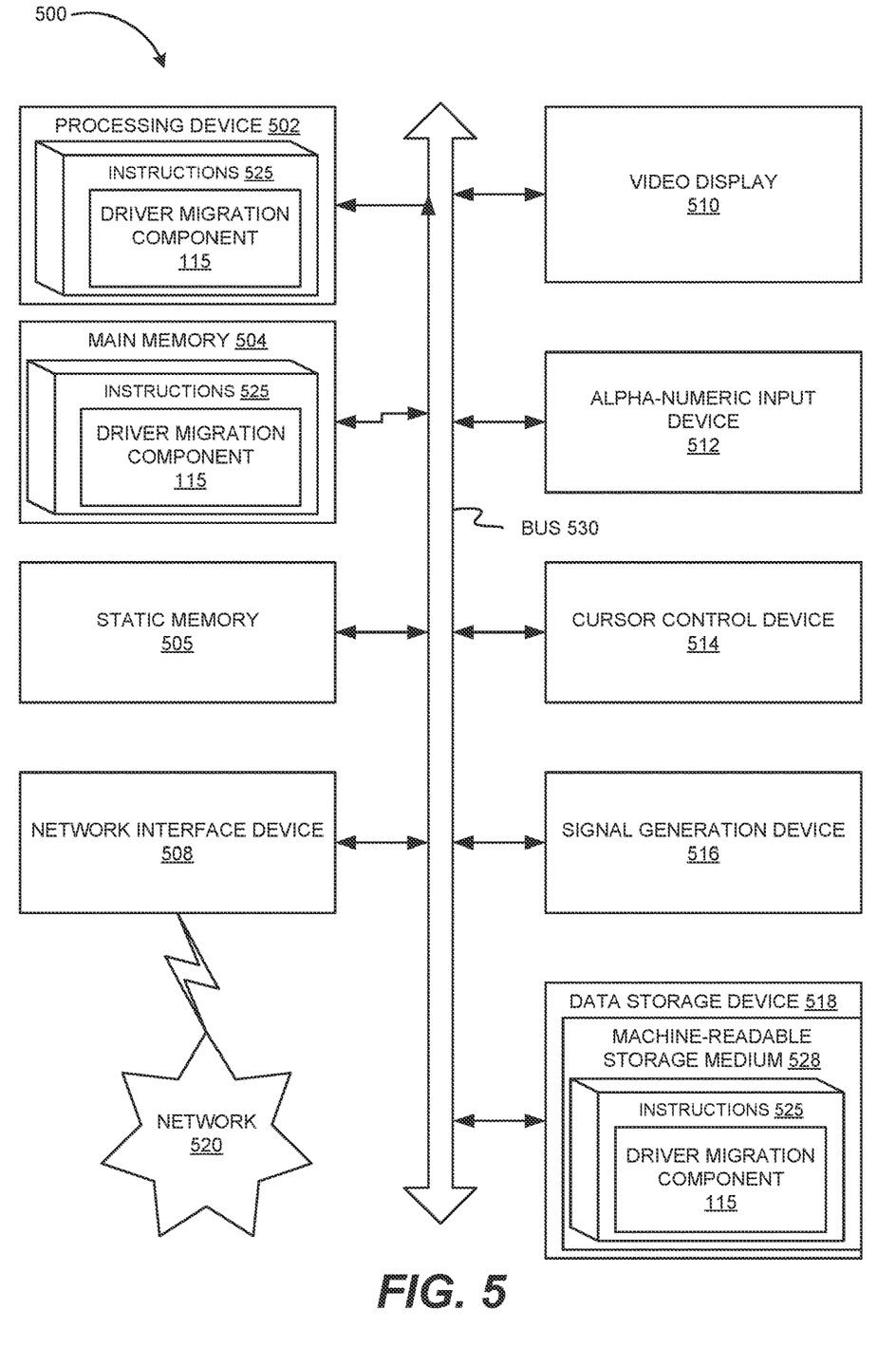
FIG. 5 is a block diagram of an example apparatus that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for a driver migration component, e.g., driver migration component 115, for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   updating a cloud networking environment from a first network mechanism driver to a second network mechanism driver;
   identifying a configuration of one or more resources of the cloud networking environment associated with the first network mechanism driver;
   determining, by a processing device, one or more features of the configuration of the one or more resources that are incompatible with the second network mechanism driver; and
   updating, by the processing device, the one or more features of the configuration of the one or more resources to be compatible with the second network mechanism driver.

2. The method of claim 1, wherein updating the one or more features of the configuration of the one or more resources comprises:
   providing one or more suggestions for updating the one or more features of the configuration of the one or more resources; and
   in response to receiving an instruction to update the one or more features of the configuration of the one or more resources, updating the one or more features.

3. The method of claim 1, wherein updating the one or more features of the configuration of the one or more resources comprises:
   in response to determining that the one or more features of the configuration of the one or more resources are incompatible with the second network mechanism driver, automatically performing changes to the one or more features of the configuration of the one or more resources.

4. The method of claim 1, wherein determining that one or more features of the configuration of the one or more resources are incompatible with the second network mechanism driver comprises:
   determining that the one or more features of the configuration of the one or more resources are different from a networking configuration associated with the second network mechanism driver.

5. The method of claim 1, wherein the configuration of the one or more resources of the cloud networking environment comprises at least one of:
   a maximum transmission unit, networking tunneling protocol, or network topology.

6. The method of claim 1, wherein the configuration of the one or more resources of the cloud networking environment comprises:
   an operating system level networking configuration.

7. The method of claim 1, wherein updating the one or more features of the one or more resources to be compatible with the second network mechanism driver is performed in response to updating the cloud networking environment from the first network mechanism driver to the second network mechanism driver.

8. A system comprising:
   a memory; and
   a processing device operatively coupled to the memory, the processing device to:
   update a cloud networking environment from a first network mechanism driver to a second network mechanism driver;
   identify a configuration of one or more resources of the cloud networking environment associated with the first network mechanism driver;
   determine one or more features of the configuration of the one or more resources that are incompatible with the second network mechanism driver; and
   update the one or more features of the configuration of the one or more resources to be compatible with the second network mechanism driver.

9. The system of claim 8, wherein to update the one or more features of the configuration of the one or more resources, the processing device is to:
   provide one or more suggestions for updating the one or more features of the configuration of the one or more resources; and
   in response to receiving an instruction to update the one or more features of the configuration of the one or more resources, update the one or more features.

10. The system of claim 8, wherein to update the one or more features of the configuration of the one or more resources, the processing device is to:
    in response to determining that the one or more features of the configuration of the one or more resources are incompatible with the second network mechanism driver, automatically perform changes to the one or more features of the configuration of the one or more resources.

11. The system of claim 8, wherein to determine that one or more features of the configuration of the one or more resources are incompatible with the second network mechanism driver, the processing device is to:
    determine that the one or more features of the configuration of the one or more resources are different from a networking configuration associated with the second network mechanism driver.

12. The system of claim 8, wherein the configuration of the one or more resources of the cloud networking environment comprises at least one of:
    a maximum transmission unit, networking tunneling protocol, or network topology.

13. The system of claim 8, wherein the configuration of the one or more resources of the cloud networking environment comprises:
    an operating system level networking configuration.

14. The system of claim 8, wherein updating the one or more features of the one or more resources to be compatible with the second network mechanism driver is performed in response to updating the cloud networking environment from the first network mechanism driver to the second network mechanism driver.

15. A non-transitory computer-readable storage medium including instructions that, when executed by a processing device, cause the processing device to:
    update a cloud networking environment from a first network mechanism driver to a second network mechanism driver;
    identify a configuration of one or more resources of the cloud networking environment associated with the first network mechanism driver;
    determine, by the processing device, one or more features of the configuration of the one or more resources that are incompatible with the second network mechanism driver; and
    update, by the processing device, the one or more features of the configuration of the one or more resources to be compatible with the second network mechanism driver.

16. The non-transitory computer-readable storage medium of claim 15, wherein to update the one or more features of the configuration of the one or more resources, the processing device is to:
provide one or more suggestions for updating the one or more features of the configuration of the one or more resources; and
in response to receiving an instruction to update the one or more features of the configuration of the one or more resources, update the one or more features.

17. The non-transitory computer-readable storage medium of claim 15, wherein to update the one or more features of the configuration of the one or more resources, the processing device is to:
in response to determining that the one or more features of the configuration of the one or more resources are incompatible with the second network mechanism driver, automatically perform changes to the one or more features of the configuration of the one or more resources.

18. The non-transitory computer-readable storage medium of claim 15, wherein to determine that one or more features of the configuration of the one or more resources are incompatible with the second network mechanism driver, the processing device is to:
determine that the one or more features of the configuration of the one or more resources are different from a networking configuration associated with the second network mechanism driver.

19. The non-transitory computer-readable storage medium of claim 15, wherein the configuration of the one or more resources of the cloud networking environment comprises at least one of:
a maximum transmission unit, networking tunneling protocol, or network topology.

20. The non-transitory computer-readable storage medium of claim 15, wherein the configuration of the one or more resources of the cloud networking environment comprises:
an operating system level networking configuration.

* * * * *